United States Patent
Wigard et al.

(10) Patent No.: US 12,231,976 B2
(45) Date of Patent: Feb. 18, 2025

(54) METHODS, DEVICES AND COMPUTER READABLE MEDIUM FOR HANDOVER RATE CONTROL

(71) Applicant: NOKIA TECHNOLOGIES OY, Espoo (FI)

(72) Inventors: Jeroen Wigard, Klarup (DK); Enric Martinez, Aalborg (DK); Istvan Zsolt Kovacs, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/345,991

(22) Filed: Jun. 11, 2021

(65) Prior Publication Data

US 2021/0410028 A1   Dec. 30, 2021

(30) Foreign Application Priority Data

Jun. 24, 2020   (FI) ..................................... 20205664

(51) Int. Cl.
*H04W 36/00*   (2009.01)
*H04W 36/32*   (2009.01)

(52) U.S. Cl.
CPC . *H04W 36/00837* (2018.08); *H04W 36/0058* (2018.08); *H04W 36/324* (2023.05)

(58) Field of Classification Search
CPC ............. H04W 24/02; H04W 36/0094; H04W 36/00837; H04W 36/0085; H04W 36/0058; H04W 36/32; H04W 36/36; H04W 36/38; H04W 84/06
See application file for complete search history.

(56) References Cited

U.S. PATENT DOCUMENTS

| | | | |
|---|---|---|---|
| 2009/0323638 A1 | 12/2009 | Catovic et al. | |
| 2013/0095839 A1* | 4/2013 | Venkatraman | H04W 36/04 455/444 |
| 2013/0171995 A1* | 7/2013 | Fujishiro | H04W 36/165 455/422.1 |
| 2015/0245259 A1* | 8/2015 | Marcum | H04W 36/00837 455/437 |

(Continued)

FOREIGN PATENT DOCUMENTS

WO   WO 2009/123512 A1   10/2009

OTHER PUBLICATIONS

Adewale et al "Ping-pong reduction for handover process using adaptive hysteresis margin: a methodological approach" https://iopscience.iop.org/article/10.1088/1757-899X/640/1/012118/pdf, 2019, 13 pages. (Year: 2012).*

(Continued)

*Primary Examiner* — Quoc Thai N Vu
(74) *Attorney, Agent, or Firm* — SQUIRE PATTON BOGGS (US) LLP

(57) ABSTRACT

A method comprising, at a user device, comprising obtaining a target parameter representative of a handover rate from a base station, comparing said target parameter representative of a handover rate with a measured parameter representative of a handover rate, adjusting at least one measurement trigger event parameter as a result of said comparison in a direction tending to reduce the difference between said two rates, sending a measurement report to said base station if a trigger condition using said at least one adjusted trigger event parameter is met.

16 Claims, 10 Drawing Sheets

(56) References Cited

U.S. PATENT DOCUMENTS

| | | | |
|---|---|---|---|
| 2015/0289169 A1* | 10/2015 | Capdevielle | H04W 36/00835 |
| | | | 455/436 |
| 2018/0049078 A1 | 2/2018 | Yang et al. | |
| 2019/0319690 A1* | 10/2019 | Tang | H04L 5/0048 |
| 2020/0145958 A1* | 5/2020 | Kim | H04W 24/10 |
| 2020/0344654 A1* | 10/2020 | Zhao | H04W 36/00837 |

OTHER PUBLICATIONS

Office Action dated Feb. 11, 2021 corresponding to Finnish Patent Application No. 20205664.
Finnish Search Report dated Feb. 11, 2021 corresponding to Finnish Patent Application No. 20205664.
3GPP TR 38.821 V16.0.0 (Dec. 2019), Technical Report, 3rd Generation Partnership Project; Technical Specification Group Radio Access Network; Solutions for NR to support non-terrestrial networks (NTN) (Release 16), Dec. 2019.
3GPP TS 38.331 V15.9.0 (Mar. 2020), Technical Specification, 3rd Generation Partnership Project; Technical Specification Group Radio Access Network; NR; Radio Resource Control (RRC) protocol specificaiton (Release 15), Mar. 2020.

* cited by examiner

METHODS, DEVICES AND COMPUTER READABLE MEDIUM FOR HANDOVER RATE CONTROL

TECHNICAL FIELD

Various example embodiments relate generally to methods, devices and computer readable medium for handover rate control.

BACKGROUND

5G NR (New Radio) is a new radio access technology (RAT) developed by 3GPP for the 5G mobile network. A non-terrestrial network (NTN) may comprise mobile airborne or spaceborne vehicles, with the base stations (gNBs) located in these vehicles, or where these vehicles act as a relay to ground-based gNBs, providing NR service. 3GPP has started working on NTN networks in TR 38.821.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

At least one example embodiment provides a method comprising, at a user device, obtaining a target parameter representative of a handover rate from a base station, comparing said target parameter representative of a handover rate with a measured parameter representative of a handover rate, adjusting at least one measurement trigger event parameter as a result of said comparison in a direction tending to reduce the difference between said two rates and sending a measurement report to the base station if a trigger condition using said at least one adjusted trigger event parameter is met.

According to one or more examples, said parameter indicative of a handover rate is one among: a measurement event trigger rate, a handover rate.

According to one or more examples, said at least one measurement trigger event parameter comprises at least one among: a hysteresis, an offset, a first threshold, a second threshold.

According to one or more examples, the method may further include receiving at least one among a minimum or maximum value for said at least one measurement trigger event parameter, and adjusting said at least one measurement trigger event parameter within the limits of said at least one minimum or maximum value.

According to one or more examples, the method may further comprise receiving a maximum adjustment of said at least one measurement event trigger event parameter for a time period, and adjusting said at least one measurement trigger event parameter within the limit of said maximum adjustment.

At least one example embodiment provides a method comprising, at a base station, sending a target parameter representative of a handover rate to a user device, receiving at least one measurement report from the user device, and conditionally initiating a handover for the user device.

According to one or more examples, said parameter indicative of a handover rate is one among: a measurement event trigger rate, a handover rate.

According to one or more examples, said target parameter representative of a handover rate is function of one or more among: a velocity, a cell beam footprint size at the level of the user device, wherein said velocity is one among: the velocity of said base station compared to the ground, the relative velocity of said base station compared to the user device, the velocity compared to the ground of an apparatus acting as relay between the user device and said base station, the relative velocity compared to the user device of an apparatus acting as relay between the user device and said base station.

According to one or more examples, the method may further comprise at least one among sending to the user device a maximum adjustment of said at least one measurement event trigger event parameter for a time period, and sending to the user device at least one among a minimum or maximum value for said at least one measurement trigger event parameter.

According to one or more examples, the method may further comprise sending to the user device an updated target parameter representative of a handover rate as a function of received measurement reports.

At least one example embodiment provides a method comprising, at a base station, obtaining a target parameter representative of a handover rate; receiving at least one measurement report from a user device, initiating a handover of said user device if a handover condition is met, comparing said target parameter representative of a handover rate with a measured parameter representative of a handover rate, adjusting at least one measurement trigger event parameter as a result of said comparison in a direction tending to reduce the difference between said two rates, and sending said adjusted at least one measurement trigger event parameter to said user device.

According to one or more examples, said target parameter representative of a handover rate is one among: a target measurement event trigger rate, a target handover rate.

According to one or more examples, the method may further comprise conditionally sending said adjusted at least one measurement trigger event parameter update upon a positive check that said adjusted at least one measurement event trigger parameter tends to lead to an increase of said measured parameter representative to a handover rate.

At least one other example embodiment provides a user device comprising at least one processor and at least one memory including computer program code. The at least one memory and the computer program code are configured to, with the at least one processor, cause the user device to at least perform obtaining a target parameter representative of a handover rate from a base station, comparing said target parameter representative of a handover rate with a measured parameter representative of a handover rate, adjusting at least one measurement trigger event parameter as a result of said comparison in a direction tending to reduce the difference between said two rates and sending a measurement report to the base station if a trigger condition using said at least one adjusted trigger event parameter is met.

According to one or more examples, said parameter indicative of a handover rate is one among: a measurement event trigger rate, a handover rate.

According to one or more examples, said at least one measurement trigger event parameter comprises at least one among: a hysteresis, an offset, a first threshold, a second threshold.

According to one or more examples, the at least one memory and the computer program code may be configured to, with the at least one processor, cause the user device to perform receiving at least one among a minimum or maximum value for said at least one measurement trigger event parameter, and adjusting said at least one measurement trigger event parameter within the limits of said at least one minimum or maximum value.

According to one or more examples, the at least one memory and the computer program code may be configured to, with the at least one processor, cause the user device to perform receiving a maximum adjustment of said at least one measurement event trigger event parameter for a time period, and adjusting said at least one measurement trigger event parameter within the limit of said maximum adjustment.

At least one other example embodiment provides a base station comprising at least one processor and at least one memory including computer program code. The at least one memory and the computer program code are configured to, with the at least one processor, cause the base station to at least perform sending a target parameter representative of a handover rate to a user device, receiving at least one measurement report from the user device, and conditionally initiating a handover for the user device.

According to one or more examples, said parameter indicative of a handover rate is one among: a measurement event trigger rate, a handover rate.

According to one or more examples, said target parameter representative of a handover rate is function of one or more among: a velocity, a cell beam footprint size at the level of the user device, wherein said velocity is one among: the velocity of said base station compared to the ground, the relative velocity of said base station compared to the user device, the velocity compared to the ground of an apparatus acting as relay between the user device and said base station, the relative velocity compared to the user device of an apparatus acting as relay between the user device and said base station.

According to one or more examples, the at least one memory and the computer program code may be configured to, with the at least one processor, cause the base station to perform at least one among sending to the user device a maximum adjustment of said at least one measurement event trigger event parameter for a time period; sending to the user device at least one among a minimum or maximum value for said at least one measurement trigger event parameter.

According to one or more examples, the at least one memory and the computer program code may be configured to, with the at least one processor, cause the base station to perform sending to the user device an updated target parameter representative of a handover rate as a function of received measurement reports.

At least one other example embodiment provides a base station comprising at least one processor and at least one memory including computer program code. The at least one memory and the computer program code are configured to, with the at least one processor, cause the base station to at least perform obtaining a target parameter representative of a handover rate; receiving at least one measurement report from a user device, initiating a handover of the user device if a handover condition is met, comparing the target parameter representative of a handover rate with a measured parameter representative of a handover rate, adjusting at least one measurement trigger event parameter as a result of said comparison in a direction tending to reduce the difference between said two rates, and sending said adjusted at least one measurement trigger event parameter to the user device.

According to one or more examples, said target parameter representative of a handover rate is one among: a target measurement event trigger rate, a target handover rate.

According to one or more examples, the at least one memory and the computer program code may be configured to, with the at least one processor, cause the base station to perform conditionally sending said adjusted at least one measurement trigger event parameter update upon a positive check that said adjusted at least one measurement event trigger parameter tends to lead to an increase of said measured parameter representative to a handover rate.

One or more example embodiments provide a user device comprising means for obtaining a target parameter representative of a handover rate from a base station, means for comparing said target parameter representative of a handover rate with a measured parameter representative of a handover rate, means for adjusting at least one measurement trigger event parameter as a result of the comparison in a direction tending to reduce the difference between said two rates, and means for sending a measurement report to the base station if a trigger condition using said at least one adjusted trigger event parameter is met.

According to one or more example embodiments, the parameter indicative of a handover rate is one among: a measurement event trigger rate, a handover rate.

According to one or more example embodiments, the at least one measurement trigger event parameter comprises at least one among: a hysteresis, an offset, a first threshold, a second threshold.

According to one or more example embodiments, the user device further comprises means for receiving at least one among a minimum or maximum value for the at least one measurement trigger event parameter; and means for adjusting the at least one measurement trigger event parameter within the limits of said at least one minimum or maximum value.

According to one or more example embodiments, the base station further comprises means for receiving a maximum adjustment of the at least one measurement event trigger event parameter for a time period; and means for adjusting the at least one measurement trigger event parameter within the limit of the maximum adjustment.

One or more example embodiments provide a base station comprising means for sending a target parameter representative of a handover rate to a user device, means for receiving at least one measurement report from the user device and means for conditionally initiating a handover for the user device.

According to one or more example embodiments, the target parameter representative of a handover rate is one among: a target measurement event trigger rate, a target handover rate.

According to one or more example embodiments, the target parameter representative of a handover rate is function of one or more among: a velocity, a cell beam footprint size at the level of the user device.

The velocity may be one among: the velocity of said base station compared to the ground, the relative velocity of said base station compared to the user device, the velocity compared to the ground of an apparatus acting as relay between the user device and said base station, the relative velocity compared to the user device of an apparatus acting as relay between the user device and the base station.

According to one or more example embodiments, the base station further comprises at least one of means for sending to the user device a maximum adjustment of said at least one measurement event trigger event parameter for a time period, and means for sending to the user device at least one among a minimum or maximum value for said at least one measurement trigger event parameter.

According to one or more example embodiments, the base station further comprises means for sending to the user device an updated target parameter representative of a handover rate as a function of received measurement reports.

One or more example embodiments provide a base station comprising means for obtaining a target parameter representative of a handover rate, means for receiving at least one measurement report from a user device, means for initiating a handover of said user device if a handover condition is met, means for comparing said target parameter representative of a handover rate with a measured parameter representative of a handover rate, means for adjusting at least one measurement trigger event parameter as a result of said comparison in a direction tending to reduce the difference between said two rates, means for sending said adjusted at least one measurement trigger event parameter to said user device.

According to one or more example embodiments, the target parameter representative of a handover rate is one among: a target measurement event trigger rate, a target handover rate.

According to one or more example embodiments, the base station further comprises means for conditionally sending said adjusted at least one measurement trigger event parameter update upon a positive check that said adjusted at least one measurement event trigger parameter tends to lead to an increase of said measured parameter representative to a handover rate.

At least one example embodiment provides a non-transitory computer-readable medium storing computer-executable instructions that, when executed by at least one processor at a user device, cause the user device to perform obtaining a target parameter representative of a handover rate from a base station, comparing said target parameter representative of a handover rate with a measured parameter representative of a handover rate, adjusting at least one measurement trigger event parameter as a result of said comparison in a direction tending to reduce the difference between said two rates, sending a measurement report to said base station if a trigger condition using said at least one adjusted trigger event parameter is met.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 7 is a graphical representation of an example of simulated handover counts when an example embodiment is applied and when it not applied in the general context of the example of FIG. 2a;

FIG. 8 is a graphical representation of simulated SINR values when an example embodiment is applied and when it not applied, in the general context of the example of FIG. 2a;

Figure 1:
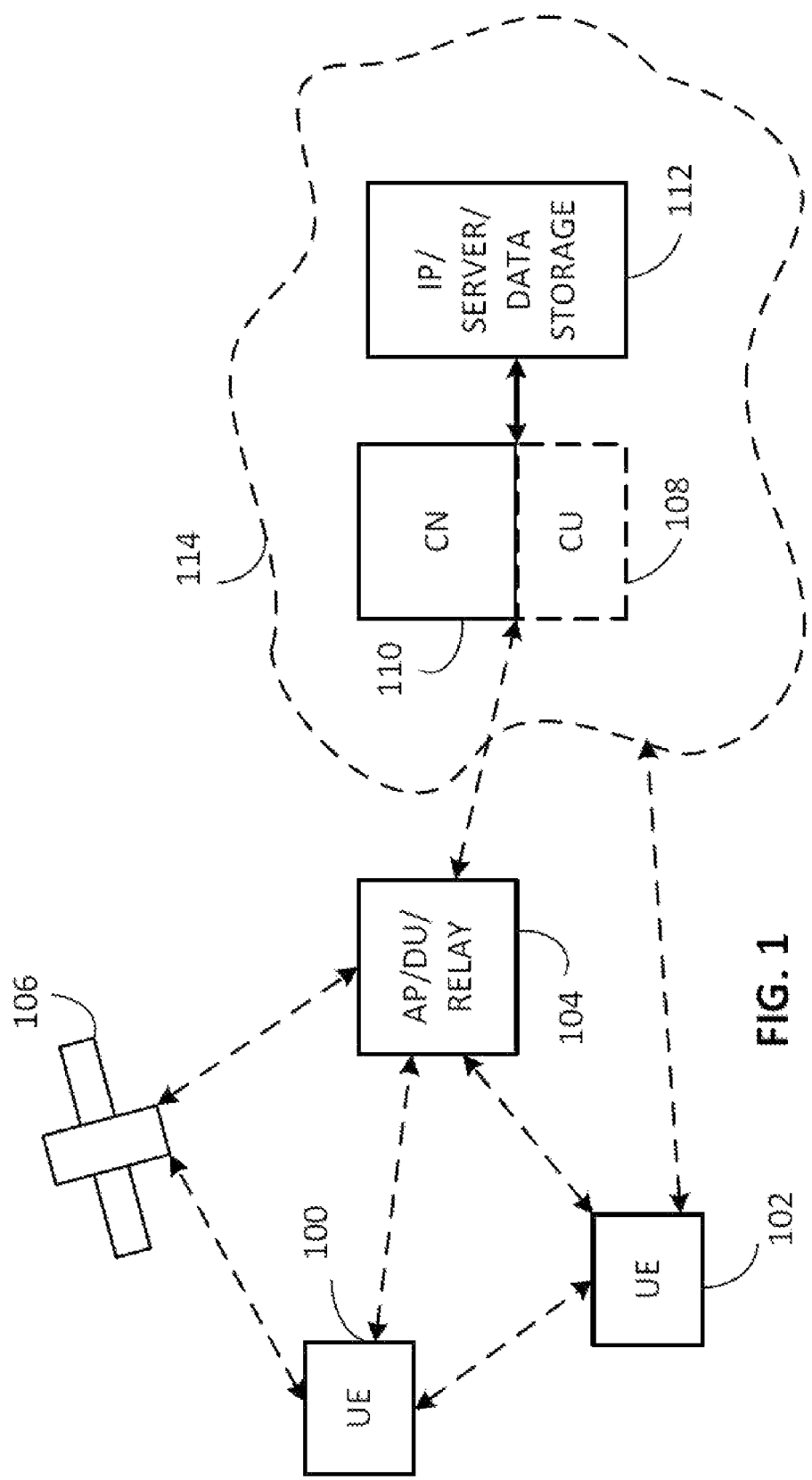
FIG. 1 is a block diagram of an example of a network architecture.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures. Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, example embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network elements, data servers, network resource controllers, network apparatuses, clients, routers, gateways, network nodes, computers, cloud-based servers, web servers, application servers, proxies or proxy servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may be any physical media that can be read, written or more generally accessed by a computer/a processing device. Examples of computer storage media include, but are not limited to, a flash drive or other flash memory devices (e.g. memory keys, memory sticks, USB key drive), CD-ROM or other optical storage, DVD, magnetic disk storage or other magnetic storage devices, solid state memory, memory chip, RAM, ROM, EEPROM, smart cards, a relational database management system, a traditional database, or any other suitable medium that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may include code from any computer-programming language, including, but not limited to, assembly, C, C++, Basic, SQL, MySQL, HTML, PHP, Python, Java, Javascript, etc. Embodiments of a computer-readable medium include, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network elements, network devices, data servers, network resource controllers, network apparatuses, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more integrated circuits one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 is a block diagram of an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 101 configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

An exemplary embodiment of a base station will be described later on with reference to FIG. 4.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may be implemented as a single hardware device or may be implemented on separate interconnected hardware devices interconnected by one or more communication links, with wired and/or wireless segments. The user device may also be called a subscriber unit, mobile station, remote terminal, access terminal, user terminal or user equipment (UE) just to mention but a few names or apparatuses.

An exemplary embodiment of a user device will be described later on with reference to FIG. 3.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 107, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 106).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Satellites 103 in the mega-constellation may cover several satellite-enabled network entities that create on-ground cells. The on-ground cells may be created through an on-ground relay node. One or more satellites 103 may also house a base station and provide direct coverage to user devices instead of acting as relay. Non-terrestrial networks (NTN) refer to networks, or segments of networks, using an air borne or space borne vehicle, such as satellites, for transmission.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In the non-limiting context of an NTN network, taking the example of a LEO satellite, the radius of a single cell beam footprint on the planet surface may typically lie between 30 km and several hundred km. The satellite may generate one or more satellite beams. The velocity of such a satellite may be about 7.5 km/s relative to the planet surface and thus the beam footprint on this surface moves at the same velocity, supposing the satellite beam direction is fixed. The mobility of a satellite may trigger high numbers of measurement reports. Note that while the example of a LEO satellite is taken for illustrative purposes, the exemplary embodiments are not limited to such a context. A person skilled in the art can easily extend the teachings described herein to any airborne or space borne vehicle, including but not limited to non-stationary satellites such as medium earth orbit (MEO) satellites and manned or unmanned aircraft.

Measurement report trigger events are described in 3GPP TS 38.331 (NR-Radio Resource Control (RRC) protocol specification), section 5.5.4 'Measurement Report Triggering'. The user device will send a measurement report to a base station when the conditions of one of the network configured measurement events are met. The base station 102 may be located in the satellite or be ground based (as shown in FIG. 1), in which case the satellite acts as a transparent relay. An optional 'time to trigger' (TTT) value may be defined—a measurement report is sent by the user device only if the conditions of an event are met for at least TTT. Based on the measurement reports, the base station can decide whether a handover is desirable (or not) and initiate (or not) a handover.

A non-exhaustive list of measurement trigger events is provided in Table 1, along with certain parameters used in the conditions associated with these events.

| Event | Description | Hysteresis | Threshold 1 | Threshold 2 |
|---|---|---|---|---|
| A1 | Serving becomes better than threshold | X | X | |
| A2 | Serving becomes worse than threshold | X | X | |
| A3 | Neighbour becomes offset better than serving | X | | |
| A4 | Neighbour becomes better than threshold | X | X | |
| A5 | Serving becomes worse than threshold 1 and neighbour becomes better than threshold 2 | X | X | X |
| A6 | Neighbour becomes offset better than S Cell | X | | |
| B1 | Inter RAT neighbour becomes better than threshold | X | X | |
| B1-NR | NR neighbour becomes better than threshold | X | X | |
| B2 | Serving becomes worse than threshold 1 and NR neighbour becomes better than threshold 2 | X | X | X |
| B2-NR | Serving becomes worse than threshold 1 and NR neighbour becomes better than threshold 2 | X | X | X |

An example handover simulation having an illustrative purpose will now be described. This simulation is based on event A3. Other events may be used instead.

Event A3 is triggered if the following condition is fulfilled:

$$Mn+Ofn+Ocn-Hys>Mp+Ofp+Ocp+Off$$

where:
 Mn=Neighbor cell measurement
 Mp=Serving cell measurement
 Ofn, Ofp=Frequency dependent offsets for neighbor and serving cells
 Ocn, Ocp=Cell dependent offsets for neighbor and serving cells
 Hys=Hysteresis
 Off=Offset
Units of the above values are in dB or in dBm depending on the measurement used.

Measurements can be carried out by the user device using RSRP (Reference Signal Received Power), RSRQ (Reference Signal Received Quality) and/or SINR (Signal to Interference Noise Ratio), but the exemplary embodiments described herein are not limited to specific measurement methods.

For the purpose of the non-limiting, illustrative simulation, the following settings are used:
 A LEO satellite at an orbit of 600 km moves at a velocity of 7.5 km/s
 The selected cell beam diameter is 50 km.
 Ofn=Ocn=Ofp=Ocp=0 dB
 Off=0 dB
 TTT=various values (in ms)
 The base station triggers a handover as soon as it receives a measurement report from the user device.

Figure 2A:
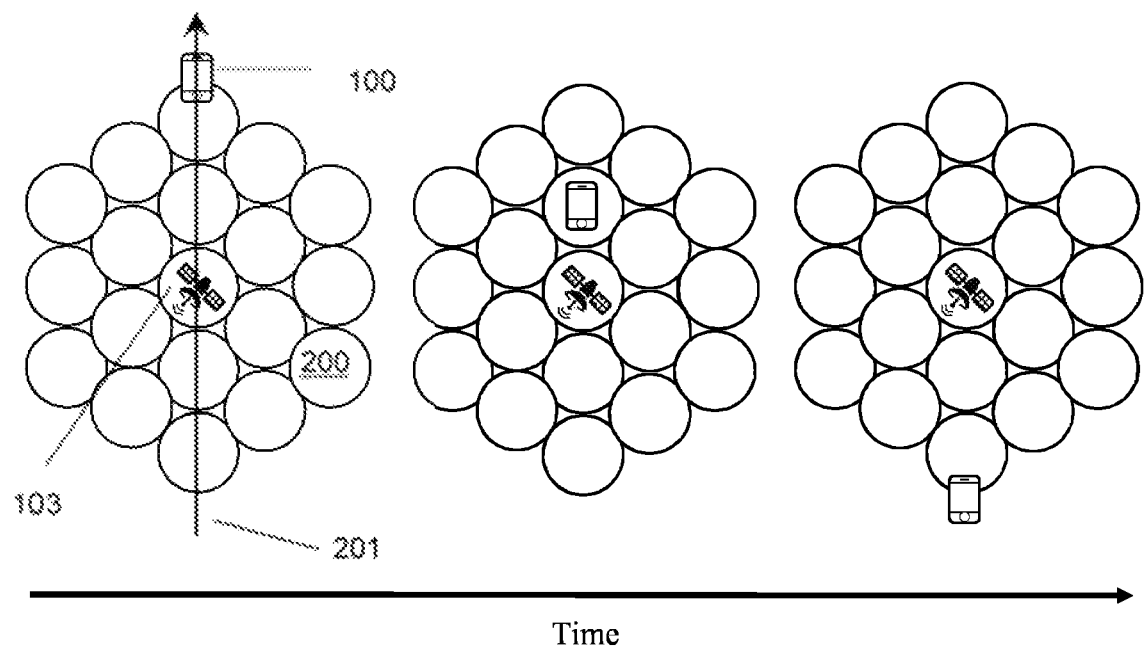
FIG. 2a is a schematic drawing representing a first example trajectory of a satellite relative to a user device.
Figure 2B:
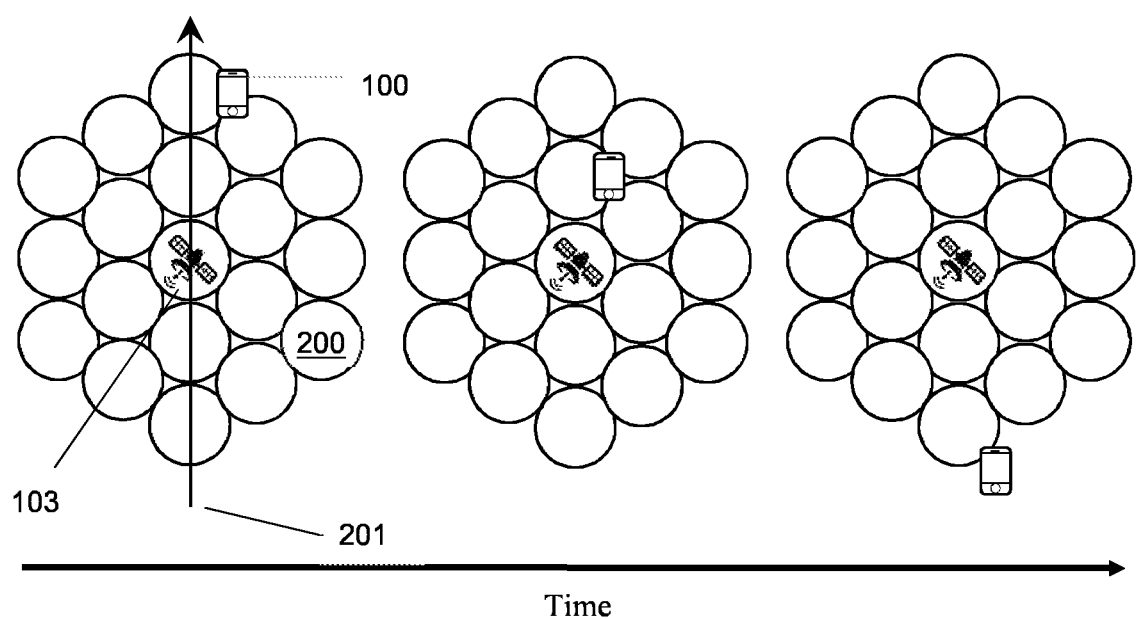
FIG. 2b is schematic diagram representing a second example trajectory of a satellite relative to a user device.

FIGS. 2a and 2b are diagrams illustrating respective positions of a user device 101 in the cell beam footprints (200) formed by a LEO satellite 103 over time, with the satellite's trajectory being represented by line 201. According to the present example, each beam footprint is represented by a circular shape for illustrative purposes and corresponds to one cell each. Shape of the beams can be different, e.g. ellipsoidal, and may vary from beam to beam. Footprints of the different beams may also partially overlap. FIG. 2a represents a case in which the position of the user device 100 is directly on the path of the satellite 103, while 2b represents the case where these is an offset between the position of the user device 100 and the path of the satellite 103, so that the user device position touches the edges of the central cell beam footprints.

Table 2 below shows the number of handovers (HO) according to a simulation for each of the FIGS. 2a and 2b, when the Time to Trigger is varied and as a function of different hysteresis values.

TABLE 2

| UE location | TTT (ms) | Hysteresis (dB) | Number of HOs | UE location | TTT (ms) | Hysteresis (dB) | Number of HOs |
|---|---|---|---|---|---|---|---|
| Center (Fig. 2a) | 0 | 0 | 8 | Edge (Fig. 2b) | 0 | 0 | 40 |
| | 10 | | 8 | | 10 | | 38 |
| | 100 | | 6 | | 100 | | 22 |
| | 256 | | 4 | | 256 | | 8 |
| | 0 | 0.5 | 6 | | 0 | 0.5 | 24 |
| | 10 | | 6 | | 10 | | 24 |
| | 100 | | 6 | | 100 | | 16 |
| | 256 | | 4 | | 256 | | 8 |
| | 0 | 1 | 6 | | 0 | 1 | 20 |
| | 10 | | 4 | | 10 | | 18 |
| | 100 | | 4 | | 100 | | 10 |
| | 256 | | 4 | | 256 | | 8 |
| | 0 | 1.5 | 4 | | 0 | 1.5 | 12 |
| | 10 | | 4 | | 10 | | 12 |
| | 100 | | 4 | | 100 | | 10 |
| | 256 | | 4 | | 256 | | 8 |
| | 0 | 2 | 4 | | 0 | 2 | 8 |
| | 10 | | 4 | | 10 | | 8 |
| | 100 | | 4 | | 100 | | 8 |
| | 256 | | 4 | | 256 | | 8 |
| | 0 | 3 | 4 | | 0 | 3 | 8 |
| | 10 | | 4 | | 10 | | 8 |
| | 100 | | 4 | | 100 | | 7 |
| | 256 | | 4 | | 256 | | 6 |

In the first case illustrated by the first four columns of Table 2, the number of handovers does not change significantly as a function of hysteresis. As an example, in that context, a 1-2 dB hysteresis appears as a possibly acceptable compromise, with a limited number of handovers. In the case second illustrated by the last four columns of Table 2, the number of handovers increases significantly for smaller hysteresis values. A reason for this is that at the cell edge, the RSRP changes slopes and the differences between cells are smaller compared to the first case. Thus for the second case, a hysteresis of 2-3 dB would appear to be an acceptable choice. In other words, the choice of handover/measurement report settings may have to be different for different locations of a user device in the coverage area of a cell.

Figure 5:
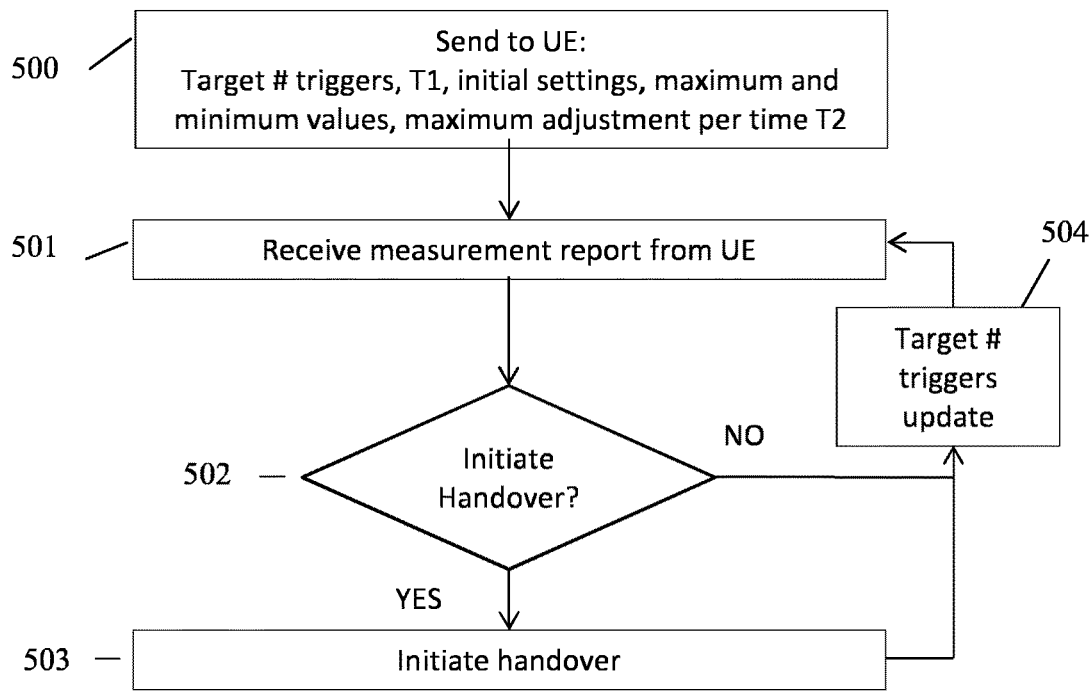
FIG. 5 is a flow chart of an example method according to a first set of exemplary embodiments seen from the point of view of a base station.

One or more exemplary embodiments will now be described in relation with FIG. 5, FIG. 6 and FIG. 11. FIG. 5 is an example flowchart of steps carried out and functions performed by an appropriately configured device or combination of devices on the network side. The non-limiting example of a base station will be taken in what follows, such as the base station 102.

At step 500, the base station transmits to the user device values indicative of a target number of measurement event triggers ('target #triggers') and a time interval T1. Both values together define a target measurement event trigger rate. While in the example of FIG. 5, these values are transmitted explicitly, they may also be transmitted implicitly, e.g. by using an index pointing to a look-up table stored at the user device. The base station may also transmit initial settings of parameters for the measurement event trigger event that the user device is supposed to use. The target number of measurement trigger events and time period T1 can for example be sent by broadcast/multicast or via Radio Resource Control protocol information elements. It may for example be communicated when a user device establishes a connection with a set of cells from one satellite, or several satellites.

According to a variant embodiment, the base station may also transmit one or more of the following: minimum and/or maximum values for one or more parameters that the user device will adjust as explained in more detail below and/or maximum adjustment values authorized for one or more parameters during a time interval T2.

The maximum and/or minimum values of the parameters and/or maximum adjustment per time T2 information may be included in the rrcConnectionReconfiguration where the events to be measured and reported are configured. The selected values can be related e.g. to the type of geographical area the satellite is covering, e.g. mountains, urban, rural, depending on the expected variability of the RSRP measurements in those environments. According to a variant embodiment, maximum adjustment per time T2 may be different into the negative direction and into the positive direction. Non-limiting numerical examples within the context of the satellite having a velocity of 7.5 km/s comprise T2=5 or 10 seconds, maximum adjustment of the hysteresis upwards=0.5 dB and downwards=1 dB within T2.

According to a variant embodiment in accordance with the use of event A3, the offset may be adjusted either at the same time or in place of the hysteresis to control the number of triggered measurement events. Increasing the offset parameter value leads to either delayed measurement event triggering, or completely avoiding such triggering, depending on the channel conditions variation vs. time at the user device. In both cases, the number of reports and handovers is reduced. Conversely, decreasing the offset parameter value would lead to event conditions fulfilled more often, thus an increase in number of measurement event triggers and this measurement reports sent to the base station from the user device.

The following data structure may be used for transmitting e.g. the minimum and maximum values of the hysteresis and offset and their respective maximum adjustment value over T2. The data structure may easily be adapted to the embodiments in which only one of the two parameters is adjusted.

```
+-reportConfig::=CHOICE [reportConfigEUTRA]
 ||+-reportConfigEUTRA::=SEQUENCE
 ||+-triggerType::=CHOICE [event]
 || |+-event::=SEQUENCE
 || |+-eventId::=CHOICE [eventA3]
 || | |+-eventA3::=SEQUENCE
 || | |+-a3-Offset::=INTEGER (–30 . . . 30) [0]
     +-a3-OffsetMin::=INTEGER (–30 . . . 30) [0]
     +-a3-OffsetMax::=INTEGER (–30 . . . 30) [0]
     +-a3-OffsetMaxAdjT2::=INTEGER(–30 . . . 30)[0]
 || | |+-reportOnLeave::=BOOLEAN [FALSE]
 || |+-hysteresis::=INTEGER (0 . . . 30) [0]
     +-hysteresisMin::=INTEGER (0 . . . 30) [0]
     +-hysteresisMax::=INTEGER (0 . . . 30) [0]
     +-hysteresisMaxAdjT2::=INTEGER (0 . . . 30) [0]
```

The target measurement event trigger rate may be defined by the base station as appropriate in view of the specific conditions at hand. According to an example embodiment, it may be derived from a target handover rate to be achieved for the user device. The base station may have knowledge of the characteristics of the satellite or other vehicle and of the satellite beam footprints. As a non-limiting example, the handover rate may be defined as a function of cell beam footprint size and a relative velocity of the base station generating the beams compared to the ground. For example, considering a cell size of 50 km and a satellite velocity of 7.5 km/s, the time needed to cross one cell through its center is 6.666 seconds, which corresponds to a handover rate of 60/6.666=9 handovers per minute. This corresponds to the example of FIG. 2a and is considered a lower bound. In the example of FIG. 2b, the user device is on a trajectory running over the edges of the cells of two columns of cells, adjacent cells in each column being at a distance of the cell size, the two columns being offset by half a cell size. Under these conditions, handovers may happen at a distance of half a cell, assuming a handover to the cell whose center is closest. Thus the handover rate would be twice as large as in FIG. 2a, i.e. 18 handovers per minute. This is considered an upper bound of the target handover rate. If the user device location/path through the cell beam footprints is not known, the target handover rate can be set between the lower and upper bounds.

According to an example embodiment, in order to obtain a target measurement event trigger rate, the handover target rate is multiplied by a coefficient equal or greater than 1 to take into account the fact that the number of measurement report triggers should be at least as high as the number of handovers, since not all measurement reports result in a handover. This coefficient may for example be of 1.25, 1.5, 2 or greater.

According to a variant embodiment, the target measurement event trigger rate is dynamically adjusted by the base station. This is shown as optional step 504 in FIG. 5. For example, if the base station observes that too many handovers during a time period T switch back and forth between two cells ('ping pong') or too many measurement trigger reports that would lead to ping pong handovers are received, then it may lower the target handover rate and the target measurement event trigger rate. If the base station does not observe any handovers resulting in switching back and forth between two cells ('ping pong') or measurement trigger reports that would lead to such switching, it may increase the target handover rate and the target measurement trigger rate.

According to a variant embodiment, the determination of the target handover rate takes into account the fact that the user device may also be mobile. The user device may for example be carried by or be part of an aircraft, a train, a car or any other vehicle. The expected velocity of the user device may be taken into account. The base station may know or obtain the velocity of e.g. an aircraft or a train from user devices on said vehicles.

Coming back to FIG. 5, at step 501, the base station receives a measurement report, following the triggering of the measurement trigger event at the user device. Based on this report, the base station will decide at step 502 whether a handover of the user device is to be initiated or not, and in the affirmative will initiate a handover process at step 503. For example, the base station may decide to systematically trigger a handover upon reception of a measurement report, or may wait to receive more than one measurement report from the user device or analyze the frequency of such reports. The general process of initiating such a handover is well known and will not be described in more detail.

Figure 6:
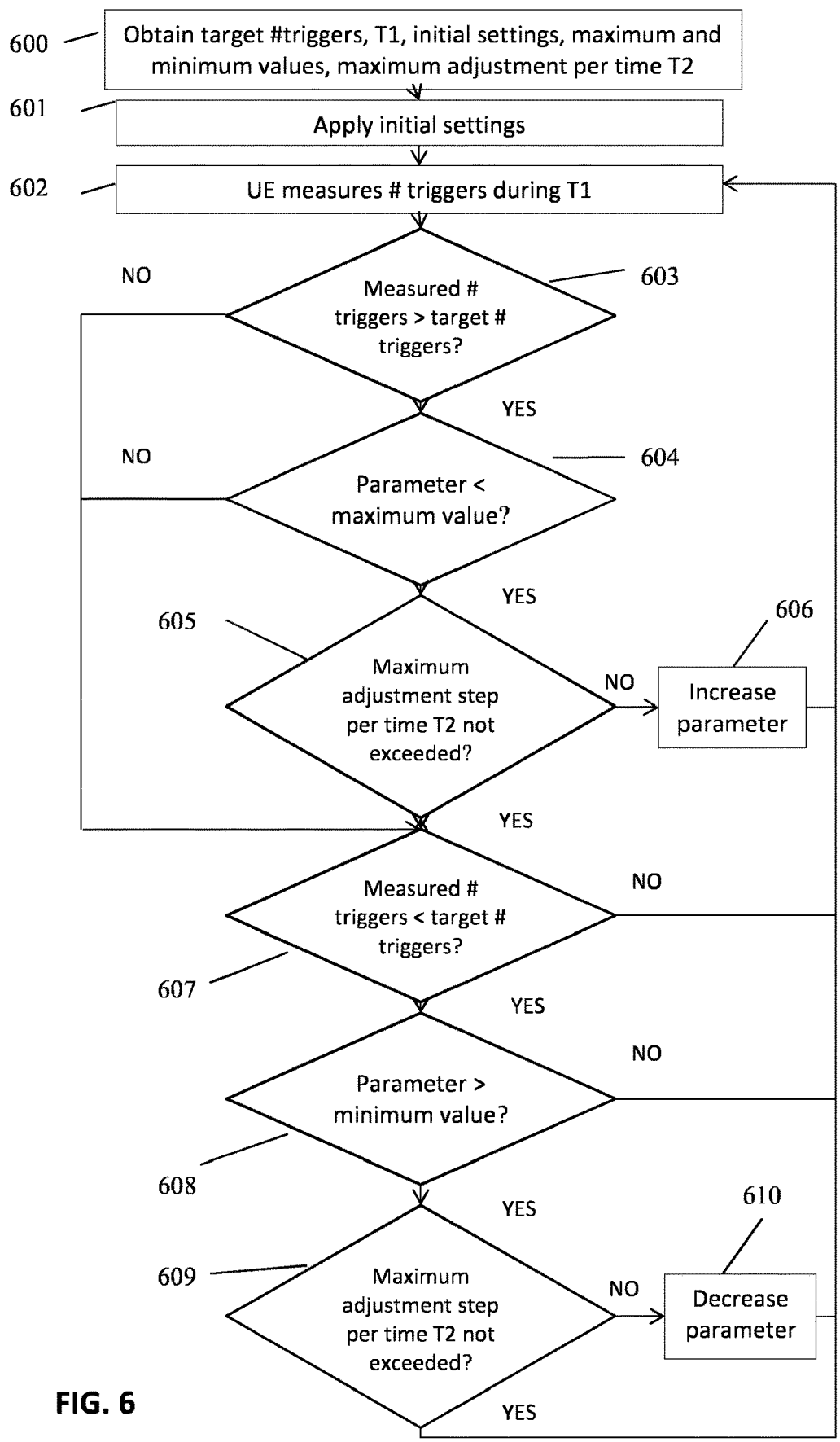
FIG. 6 is a flow chart of an example method according to a first set exemplary of embodiments seen from the point of view of a user device.

FIG. 6 is a flowchart related to one or more example embodiments described in conjunction with FIG. 5, but seen from the user device's perspective. At a step 600, the user device receives the data sent by the base station at step 500. This data comprises the target number of measurement event triggers ('target #triggers') and time T1, as well as the initial event parameter settings. According to a variant embodiments mentioned above, it may also comprise minimum and maximum adjustable parameter values and/or maximum adjustment values during time interval T2.

At step 601, the user device applies the event dependent initial settings it received.

According to an example embodiment using event A3, the settings comprise cell and frequency dependent offsets (Ofn, Ofp, Ocn, Ocp), an initial hysteresis value (Hys) and an offset (Off). Of course, the settings would be different for other events.

According to an example embodiment, the user device explicitly receives a target number of measurement event triggers and associated time T1 which it uses to reset an event trigger counter, other implementations may easily be derived by the person skilled in the art. For example, the base station may transmit a measurement event trigger rate, and the user device may use a sliding time interval window to calculate that rate.

Coming back to FIG. 6, at step 602, the user device evaluates the number of measurement event triggers per time interval T1 ('measured number of event triggers').

According to an example embodiment, the evaluation may be performed periodically. This may for example be performed using a counter which is reset every T1. At step 603, at the end of a period T1, the user device checks whether the number of event triggers in the measurement event trigger counter is greater or smaller than the target number of measurement event triggers per T1 (steps 603 and 607 respectively) and adjusts a parameter accordingly to either lead to a reduction or an increase of the measurement event trigger rate, in a way which lets this rate converge to the target rate, or, in other words, tends to reduce the difference between the two rates.

According to an example embodiment using event A3 as measurement trigger event, the adjusted parameter is the hysteresis. As previously discussed in relation with FIG. 3, FIG. 4 and Table 1, increasing the hysteresis reduces the number of event triggers, whereas reducing the hysteresis increase the number of event triggers.

While in an example embodiment based on event A3, the only parameter that is adjusted is the hysteresis, other parameters or combinations parameters may be adjusted.

According to example embodiments, the parameters to be adjusted comprise one of the hysteresis, an offset, a threshold or two thresholds, depending on the parameters available for a specific measurement trigger event. According to an example embodiment in which a measurement trigger event comprises both hysteresis and one or two thresholds, only thresholds are adjusted (either one threshold, if only one threshold is available, or one or two thresholds, if two thresholds are available). According to an example embodiment, several parameters are adjusted to combine their effects with regard to measurement event trigger rate reduction or increase.

According to an example embodiment illustrated by FIG. 6, it is assumed that if the measurement event trigger rate needs to be reduced, the parameter needs to be increased and vice-versa. The choice made for the example of FIG. 6 is due to the fact that if the parameter to be adjusted is any of the hysteresis, an offset, a first threshold and a second threshold, then the increase of any of these leads to a decrease in measurement event triggers and the decrease of any of these lead to an increase of measurement event triggers. The effect on the number of event triggers could be inverted in other embodiments using other types of parameters and steps 603 to 610 would then be adapted accordingly. In the example embodiment of FIG. 6, increase of the adjusted parameter is performed at step 606 whereas decrease of the adjusted parameter is performed at step 610.

According a variant embodiment mentioned above, additional conditions may be checked before increasing or decreasing mobility parameters, e.g. whether the adjusted parameter has reached a maximum and/or minimum value (see FIG. 6, respectively steps 604 and 608) and/or whether an adjustment amplitude during a time period T2 is smaller or greater than a maximum value (resp. optional steps 605 and 609). One purpose of the minimum and/or maximum parameter values may be to avoid extreme situations in which the target and measured rates do not converge. One purpose of the maximum adjustment per time T2 may be to reduce the risk of too large oscillations.

In parallel with the example embodiment of FIG. 6, the user device also carries out the measurements required by the measurement trigger event and generates corresponding measurement reports. According to an example embodiment illustrated by FIG. 11, the user devices takes measures at a step 1100, checks event trigger conditions using the adjusted parameter values (taking into account the time to trigger TTT) at step 1101, sends measurement reports to the base station when said trigger conditions are met at step 1102, checks whether a handover is initiated by the base station at step 1103 and participates in handovers initiated by the base station at step 1104.

According to a variant embodiment, the user device may inform the base station of the adjusted mobility parameter values (e.g. hysteresis and/or one or more thresholds and/or offset) at appropriate occasions, e.g. when sending a measurement report. This may allow the base station to check whether maxima or minima previously defined have been reached. Knowing the actual values used may also allow the base station to deduce a reason for not receiving measurement reports from the user device, e.g. the differences in measurements made by the user device are lower than the currently applied hysteresis.

FIG. 7 to FIG. 10 are graphical representations resulting from a simulation based on the use of the A3 trigger event, with the conditions described in conjunction with FIG. 2a, FIG. 2b, FIG. 3 and FIG. 4, and with hysteresis being the mobility parameter adjusted by the user device.

Figure 7:
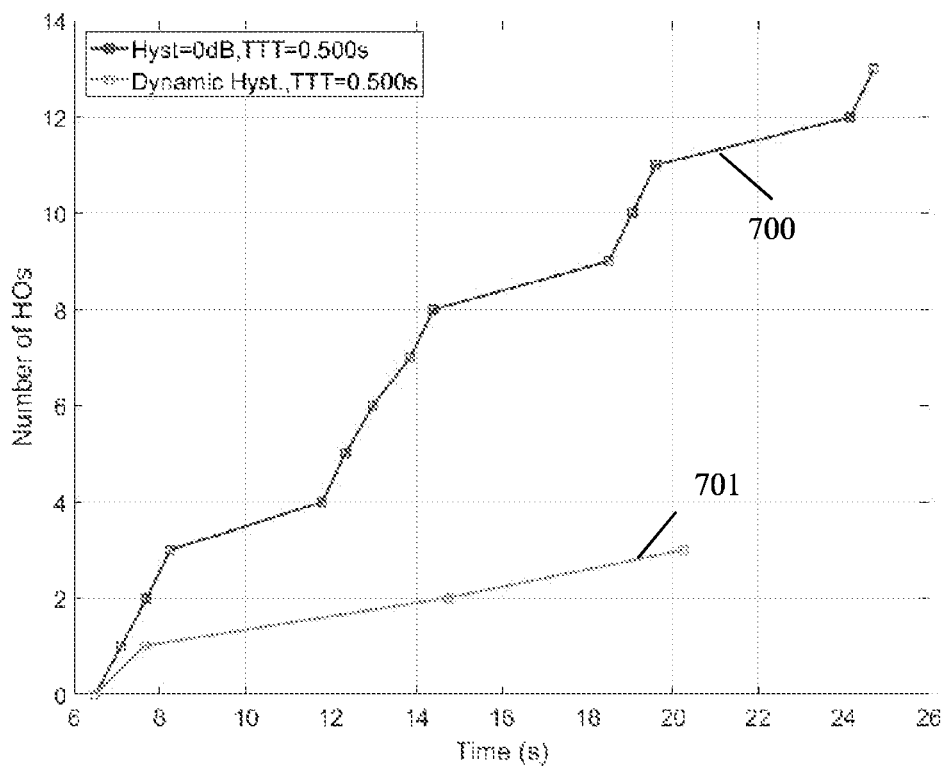

FIG. 7 is a graphical representation of the number of handovers cumulated over time for the case of FIG. 2a (the user device is directly on the trajectory of the satellite), with either a constant hysteresis of 0 dB (curve 700) or a dynamically adjusted hysteresis according to the present embodiment (curve 701), with a time to trigger of 500 ms. It can be seen that the number of handovers decreases significantly with the dynamic adjustment of the hysteresis.

Figure 8:
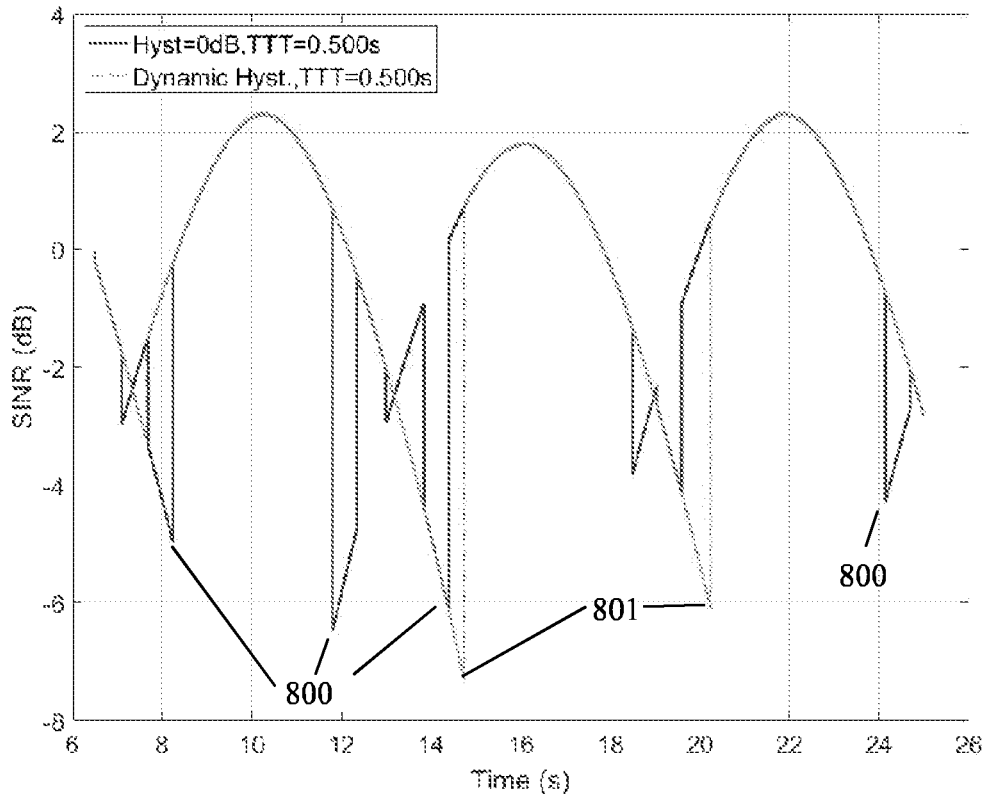

FIG. 8 represents the SINR in a case similar to FIG. 7. Curve 800 corresponds to the SINR when the hysteresis is kept constant at 0 dB while curve 801 corresponds to the SINR when the hysteresis is dynamically adjusted according to the present embodiment. As can be seen, both curves overlap to a large extent, with some negative spikes in curve 800 which disappear when the hysteresis is dynamically adjusted. This is caused by the removal of certain handovers by the method according to the present embodiment around that point in time.

Figure 9:
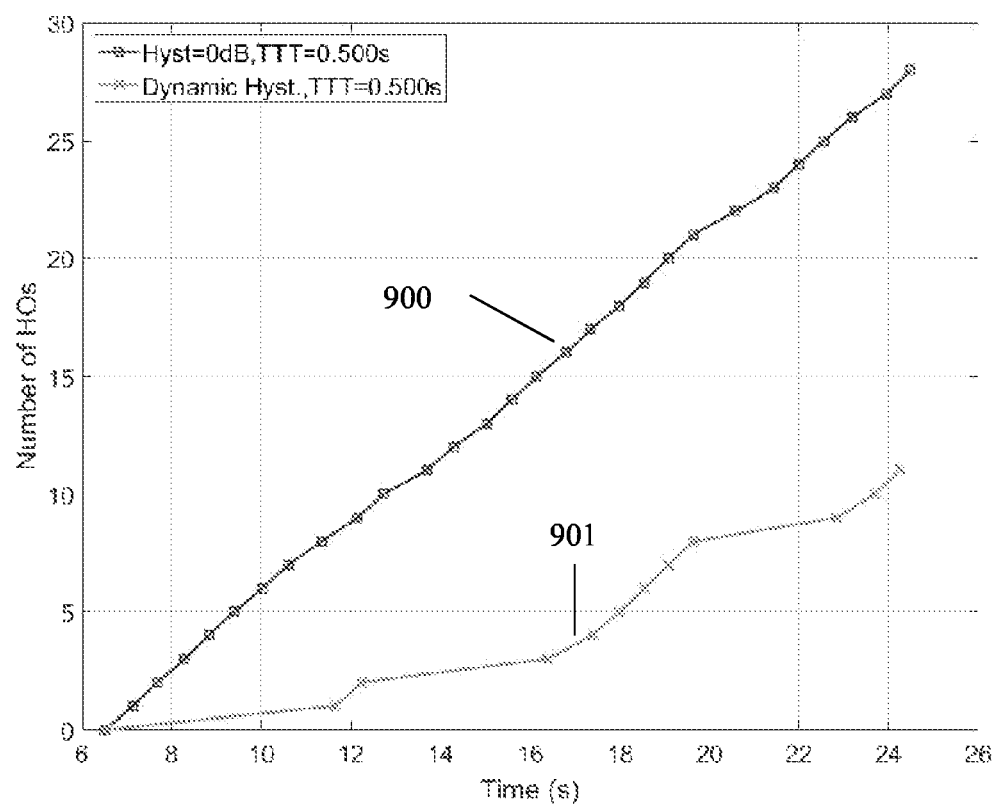
FIG. 9 is a graphical representation of an example of simulated handover counts when an example embodiment is applied and when it not applied in the general context of the example of FIG. 2b.

FIG. 9 is a graphical representation of the number of handovers cumulated over time for the case of FIG. 2b (the trajectory of the satellite is such that the user device touches cell beam footprint edges), with either a constant hysteresis of 0 dB (curve 900) or a dynamically adjusted hysteresis according to the present embodiment (curve 901), with the dynamically adjusted hysteresis represented by curve 902. As can be seen, the number of handovers is significantly reduced for curve 901.

Figure 10:
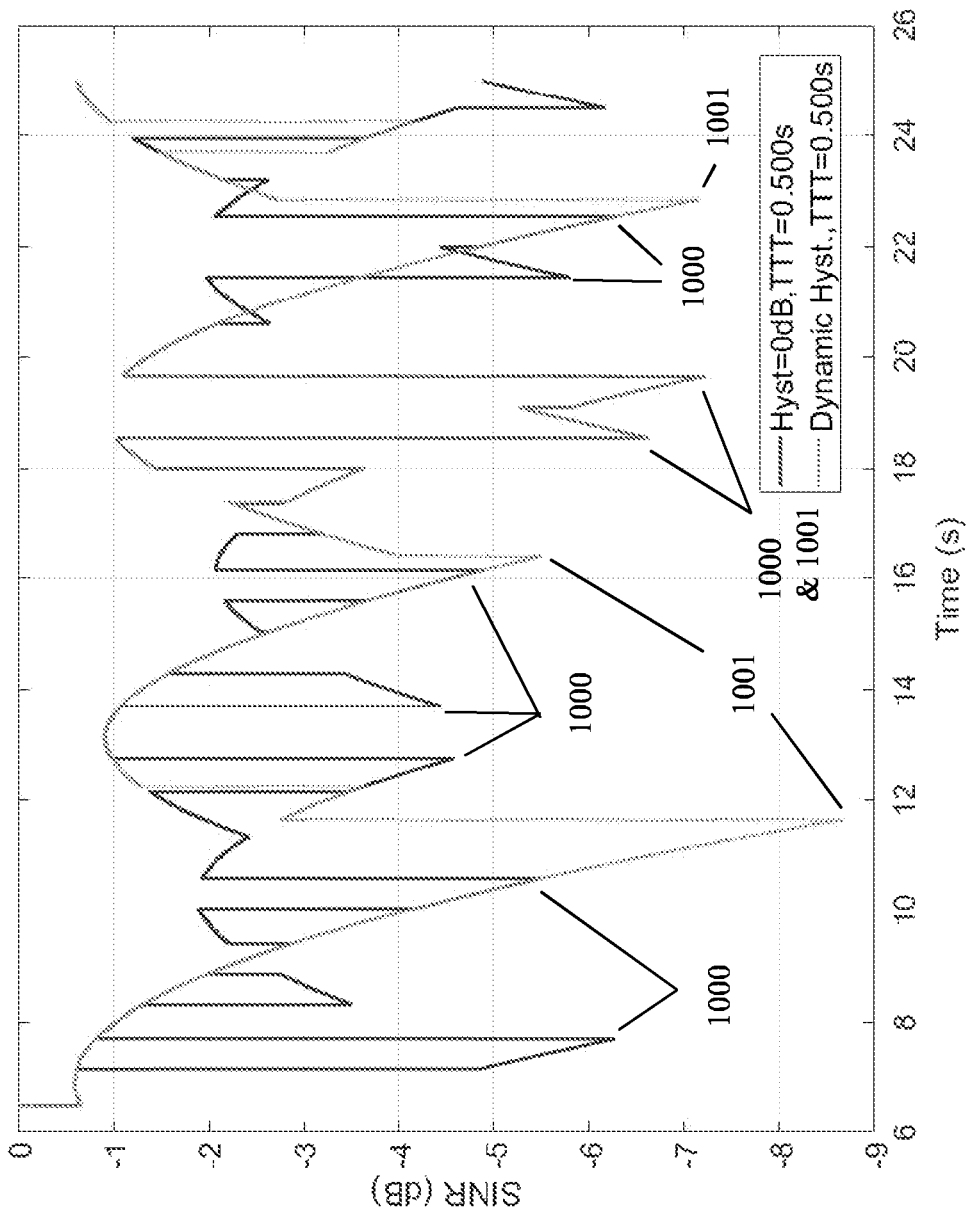
FIG. 10 is a graphical representation of simulated SINR values when an example embodiment is applied and when it not applied, in the general context of the example of FIG. 2b.

FIG. 10 represents the SINR in the same case as FIG. 9. Curve 1000 (full line) corresponds to the SINR when the hysteresis is kept constant at 0 dB while curve 1001 (dotted line) corresponds to the SINR when the hysteresis is dynamically adjusted according to the present embodiment. As can be seen, the number of spikes is generally reduced, i.e. the SINR improves in most instances, with the exception of one negative spike for curve 1001.

According a variant embodiment, the base station sends a target handover rate to the user device instead of a target measurement event trigger rate. The user device can calculate a measured handover rate based on the handovers initiated by the base station and adjust parameters as described above. With regard to the explanations above and FIG. 5, FIG. 6 and FIG. 11, 'target number of triggers' or 'target #triggers' can generally be replaced by 'target number of handovers'.

When one of the above exemplary embodiments is applied, the user device, for example through delayed or avoided measurement event triggering depending on channel condition variation over time, generates fewer measurement reports and is submitted to less handovers and thus potential handover failure as well as control plane load. Since especially in an NTN network, propagation delays may be important, less signaling may be advantageous. At the same time, the user device adjusts its own parameters with relatively little signaling needed between the user device and the base station. A lower signaling load on the user device side translates into less usage of battery power in case of an autonomous user device.

One or more exemplary embodiments will now be described in conjunction with FIG. 12 and FIG. 13. According to these embodiments, parameter adjustment is carried out by a network device (or combination of network devices) other than the user device. The non-limiting example of a base station will be taken.

Figure 12:
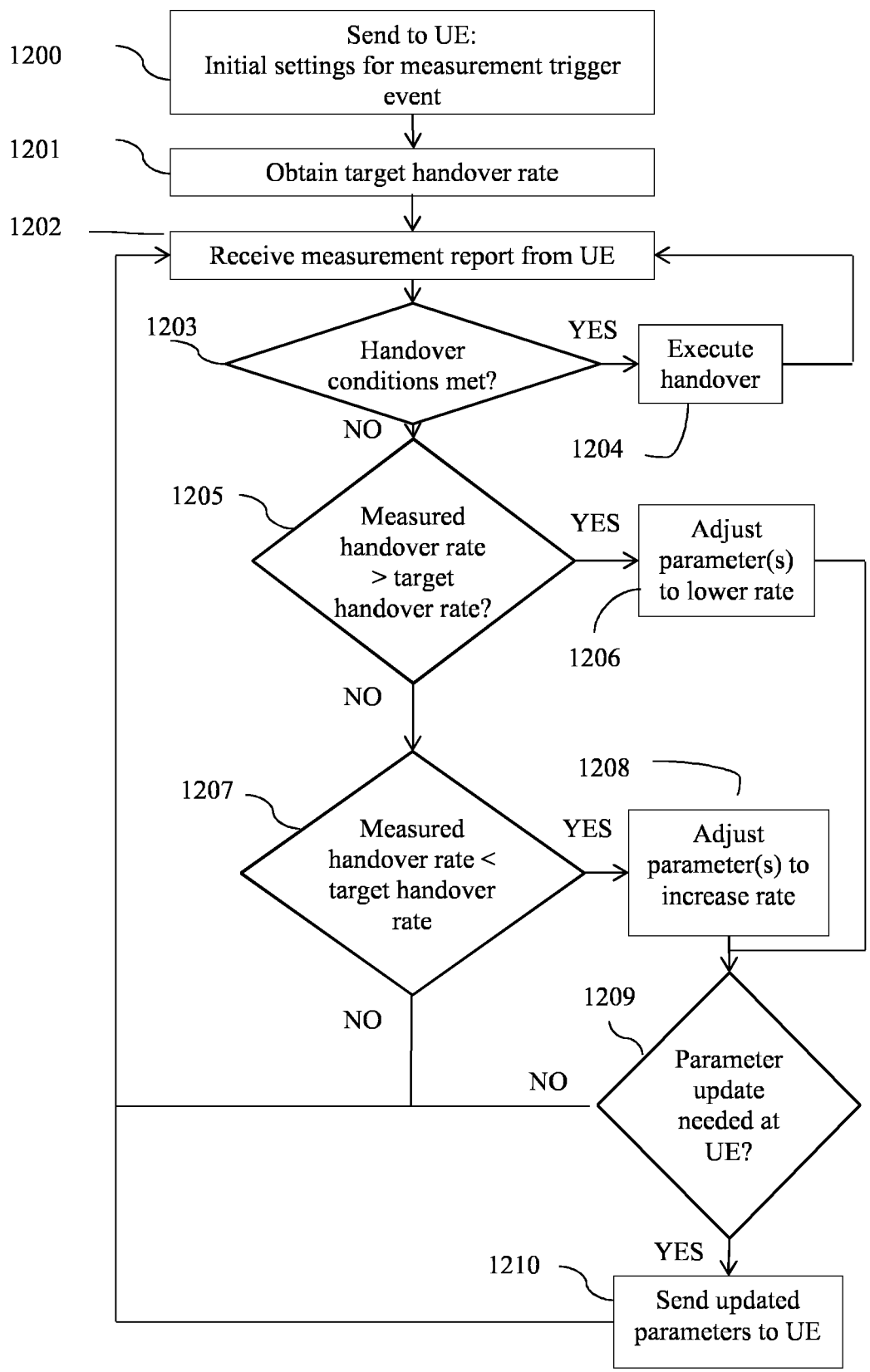
FIG. 12 is a flow chart of an example method according to a second set of exemplary embodiments, seen from the point of view of a base station.

FIG. 12 is a flowchart of steps carried out by the base station according to an exemplary embodiment.

In a step 1200, the base station sends initial event settings to the user device.

In a step 1201, the base station obtains a target handover rate. This handover rate can be obtained in a manner similar to what was described in conjunction with FIG. 5.

In a step 1202, the base station receives a measurement report from the user device.

In a step 1203, the base station checks whether based on the contents of the report, conditions are met to initiate a handover, in which case it initiates a handover at step 1204.

If the conditions for a handover are not met, the base station determines at step 1205 whether a measured handover rate is greater than the target handover rate. If this is the case, it adjusts at step 1206 at least one parameter so as to obtain a reduction of the handover rate as previously explained in relation with the example embodiments described with the help of FIG. 5, FIG. 6 and FIG. 11.

If the measured handover rate is not greater than the target handover rate, the base station checks at step 1207 whether the measured handover rate is smaller than the target handover rate. If this is the case, it adjusts at step 1208 at least one parameter so as to obtain an increase of the handover rate as previously explained.

If a parameter (or, depending on implementation and event type, more than one parameter) has been adjusted, a test is carried out at step 1209 whether the new parameter value is to be updated at the user device. If this is the case, a parameter update is sent to the user device.

The process is then repeated from step 1201.

Figure 11:
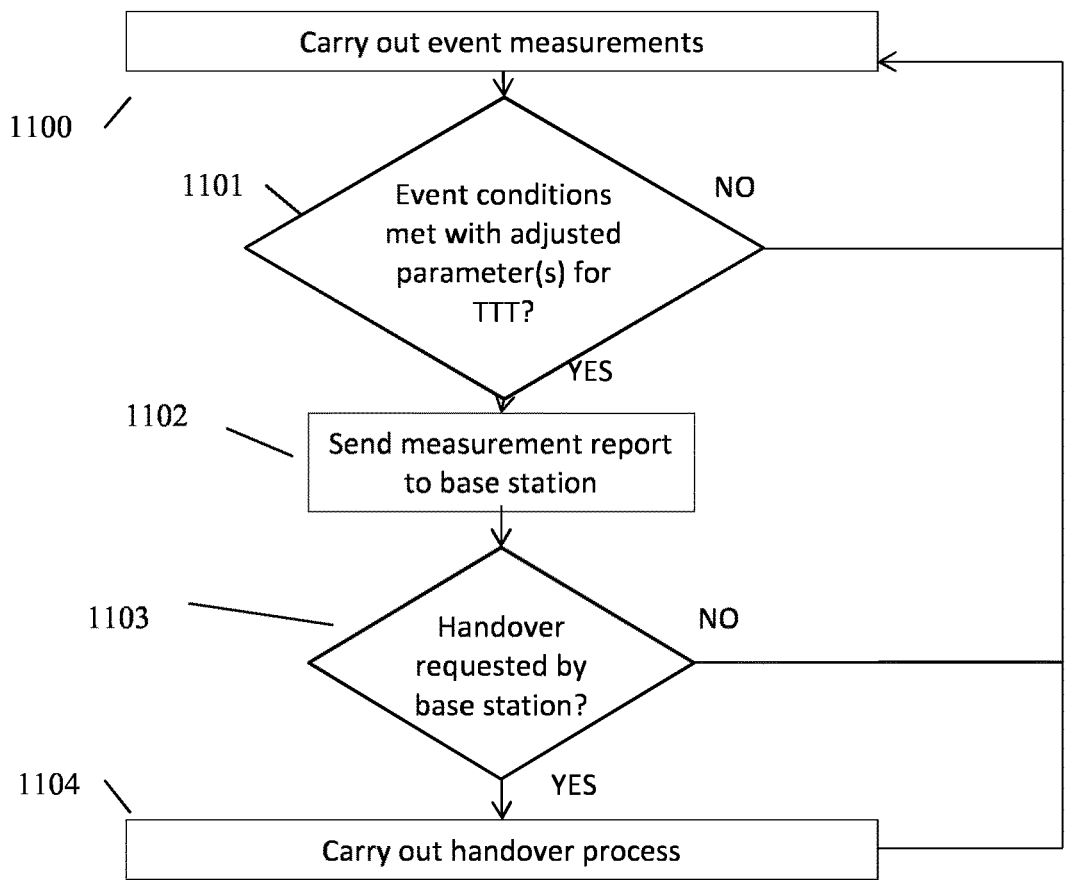
FIG. 11 is a flow chart of an additional example method according to a first set of exemplary embodiments seen from the point of view of the user device.

Adjustable parameters are the same as for the example embodiments described in relation with FIG. 5, FIG. 6 and FIG. 11.

Figure 13:
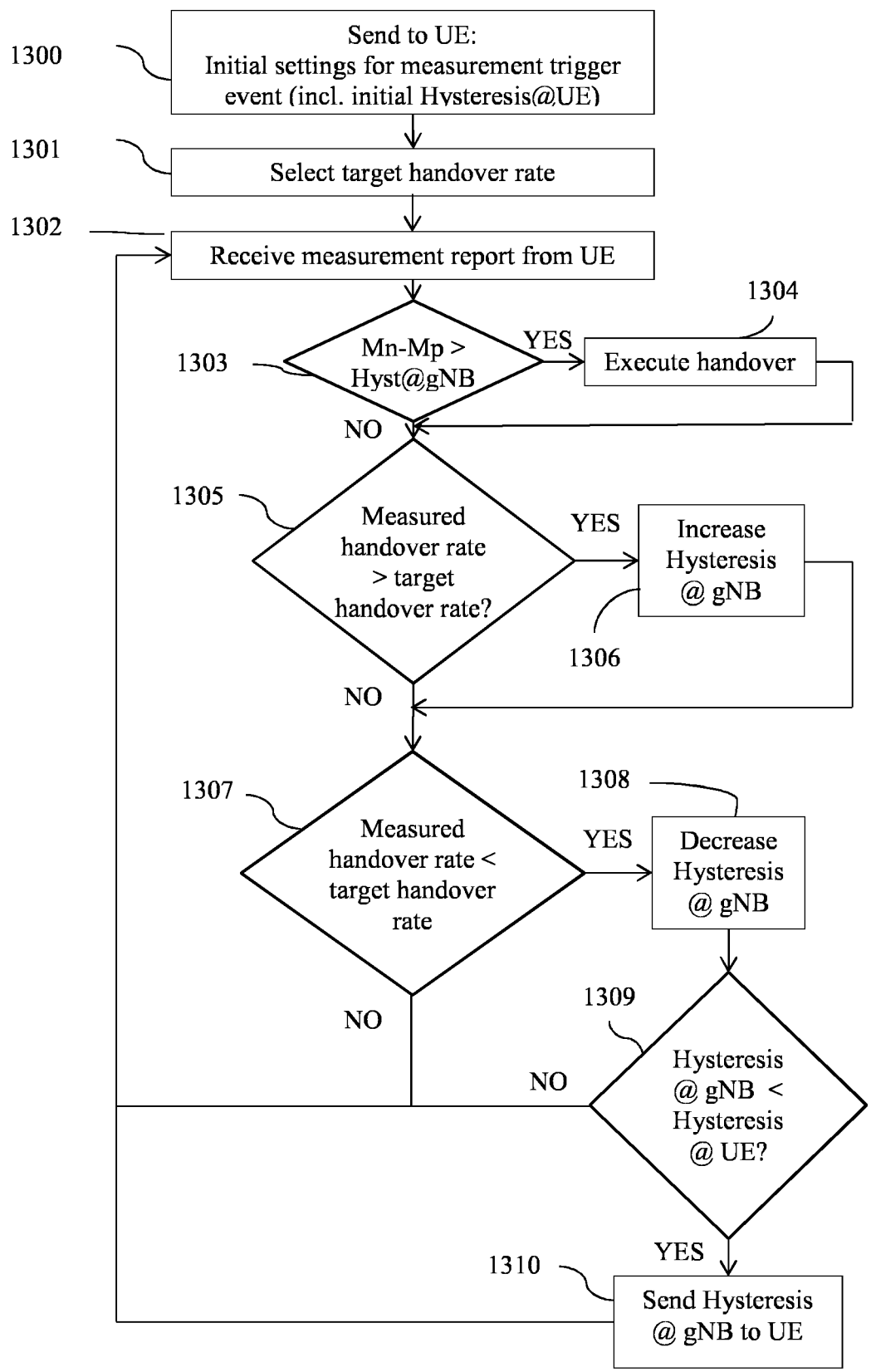
FIG. 13 is a flow chart of an example method according to the second set of exemplary embodiments, seen from the point of view of a base station, and wherein an adjustable hysteresis is used.

FIG. 13 is a flowchart of steps carried out by the base station according to one exemplary embodiment in which event A3 is used as the trigger event and the hysteresis is used as adjustable parameter. In the description of FIG. 13, 'Hys @gNb' refers to a hysteresis value stored at the base station, whereas 'Hys @UE' refers to the hysteresis value stored at the user device.

In a step 1300, the base station sends initial event settings to the user device—these include an initial hysteresis value to be used by the user device in checking the measurement event trigger. Initially, 'Hys @gNb' and 'Hys @UE' are equal.

In a step 1301, the base station obtains a target handover rate. This handover rate can be obtained in a manner similar to what was described in conjunction with FIG. 5.

In a step 1302, the base station receives a measurement report from the user device.

In a step 1303, the base station checks whether based on the contents of the report, conditions are met to initiate a handover, in which case it initiates a handover at step 1304 and then continues with step 1305. If the conditions to initiate a handover are not met, it goes directly to step 1305.

The base station determines at step 1305 whether a measured handover rate is greater than the target handover rate. If this is the case, it increases the hysteresis value 'Flys @ gNb' at step 1306 and the next step is step 1307.

If the measured handover rate is not greater than the target handover rate, the base station checks at step 1307 whether the measured handover rate is smaller than the target handover rate. If this is the case, it reduces the hysteresis value 'Flys @ gNb' at step 1308. If the hysteresis value 'Flys @ gNb' becomes lower than the value 'Flys @ UE' stored at the user device, this being checked at step 1309, then the base station updates the hysteresis value at the user device.

The process is then repeated from step 1301.

It is to be noted that in the example of FIG. 13, the hysteresis value 'Hys @gNb' adjusted by the base station is updated at the user device only if it becomes lower than 'Hys @UE'. This update tends to increase the number of measurement event triggers at the user device. Depending on implementations, there may be no need to update 'Hys @UE' to higher values if a high number of measurement reports does not matter. However, according to an example embodiment, in order to reduce the number of measurement reports, an update of 'Hys @UE' can also be carried out when this value is lower than 'Hys @gNb'.

Implementation details and variant embodiments previously mentioned are generally also applicable to the example embodiments described with the help of FIG. 12 and FIG. 13, in particular but not limited to the choice of one or more parameters to be adjusted, the use of additional checks carried out before adjustment based e.g. on maximum and minimum parameter values, the maximum adjustment over a period of time T2, updating the target handover rate dynamically, the determination of a target handover rate or a target measurement trigger rate.

In the example embodiments described in related with FIG. 5, FIG. 6 and FIG. 11, the user device carries out parameter adjustment in view of a target measurement event trigger rate. In the example embodiments described in relation with FIG. 12 and FIG. 13, the base station carries out parameter adjustment in view of a target handover rate. One reason for using these different types of targets for the different example embodiments is that the user device has control of whether or not to send a measurement report, whereas the base station decides whether a handover is to be executed or not. However, as mentioned earlier, the number of measurement reports generally equals or caps the number of handovers. There is thus a relationship between the two rates.

According to a variant embodiment of the example embodiments described in relation with FIG. 5, FIG. 6, and FIG. 11, the target value provided by the base station to the user device is a target handover rate instead of a target measurement event trigger rate. The user device can determine a measured handover rate since it participates in the handovers initiated by the base station.

Conversely, according to a variant embodiment of the example embodiments described in relation with FIG. 12 and FIG. 13, in which adjustment of one or more parameters is performed on the network side, the base station obtains a target measurement event trigger rate, obtains information on an actual measurement trigger rate for a given user device e.g. by counting the measurement reports received from the device during a time period T1, performs parameter adjustment accordingly and sends parameter update messages to the user device for implementation of the adjustment.

While the example of a LEO satellite has been used for non-limiting illustrative purposes above, the embodiments described can also be adapted to the case of a geostationary satellite or stationary or semi-stationary manned or unmanned device when the user device is mobile, for example when it is located on or part of an aircraft, a train or a car.

The parameters of the events listed in Table 1 comprise hysteresis, with some events using an offset and from zero to two thresholds. The exemplary embodiments described herein are not limited to these events and combinations of parameters. Also, the person skilled in the art could easily adapt the teachings of the present description to other events than those defined in Table 1.

Figure 3:
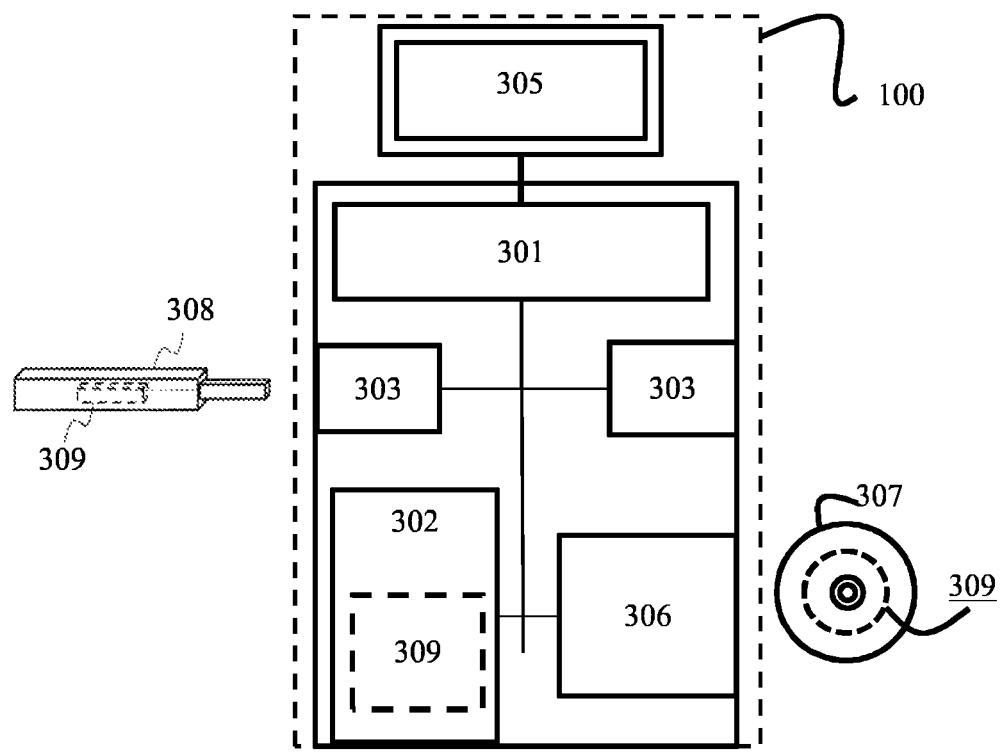
FIG. 3 is a functional block diagram of an example embodiment of a user device.

FIG. 3 is a schematic diagram showing components of an example user device 100. The user device may be implemented as a processing device for performing the functions described herein for the user device, such as but not limited to the functions illustrated by FIG. 6 and FIG. 11. User device 100 may for example communicate with a base station located in satellite 103 or in a ground station in communication with satellite 103.

As represented schematically on FIG. 3, the user device may include at least one processor 301, at least one memory 302, and one or more communication interfaces 303 (e.g. network interfaces for access to a wired/wireless network, including Ethernet interface, WIFI interface, USB interfaces etc) configured to communicate via network and/or to one or more peripheral devices (including a computer-readable storage medium 304). The user device may include other associated hardware such as user interfaces 305 (e.g. keyboard, mice, display screen, etc. . . . ) connected via appropriate communication interface(s) 303 with the processor. The user device may further include a media drive 306 for reading a computer-readable storage medium 307. The processor 301 is connected to each of the other components in order to control operation thereof.

The processor 301 may be any suitable microprocessor, microcontroller, integrated circuit, or central processing unit (CPU) including at least one hardware-based processor or processing core.

The processor 301 may be configured to store, read, load and/or otherwise process computer program code 308 stored in a computer-readable storage medium 307 or 308 and/or in the memory 302 that, when executed by the at least one processor, causes the user device to perform one or more steps of a method described herein for the user device.

The memory 302 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 302 may be configured to store, amongst other things, an operating system of the processing device and/or one or more computer program code of one or more software applications. The RAM of the memory 302 may be used by the processor 301 for the temporary storage of data.

Some exemplary embodiments of a computer-readable storage mediums 307, 308 have been described at the beginning of the detailed description.

Figure 4:
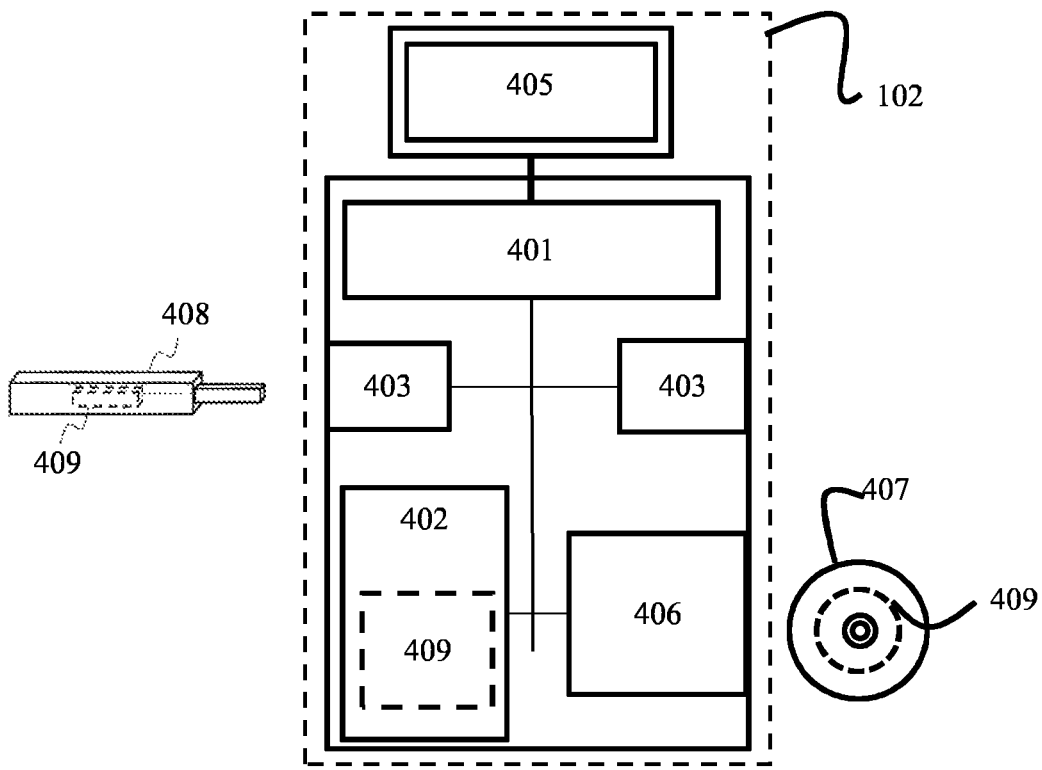
FIG. 4 is a functional block diagram of an example embodiment of a base station.

FIG. 4 illustrates an example embodiment of a base station 102. The base station may be used for implementing the functions of the methods shown in FIG. 5, FIG. 12 and FIG. 13.

As represented schematically on FIG. 4, the base station may include at least one processor 401, at least one memory 402, and one or more communication interfaces 403. The base station may include other associated hardware such as user interfaces 405 connected via appropriate communication interface(s) 403 with the processor. The base station may further include a media drive 406 for reading a computer-readable storage medium 407. The processor 401 is connected to each of the other components in order to control operation thereof.

The processor 401 may be configured to store, read, load and/or otherwise process computer program code 408 stored in a computer-readable storage medium 407 or 408 and/or in the memory 402 that, when executed by the at least one processor, causes the base station to perform one or more steps of a method described herein for the base station.

For examples, embodiments and implementations of each of the components 401 to 409, one may refer to those already provided for corresponding components 301 to 309.

In the present description, functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. A method comprising, at a user device:
   obtaining a target parameter representative of a handover rate from a base station;
   comparing said target parameter representative of a handover rate with a measured parameter representative of a handover rate;
   adjusting at least one measurement trigger event parameter as a result of said comparison to reduce the difference between said two rates;
   sending a measurement report to said base station if a trigger condition using said at least one adjusted trigger event parameter is met;
   receiving at least one among a minimum or maximum value for said at least one measurement trigger event parameter; and
   adjusting said at least one measurement trigger event parameter within limits of said at least one minimum or maximum value.

2. The method according to claim 1, wherein said parameter indicative of a handover rate comprises one of a measurement event trigger rate or a handover rate.

3. The method according to claim 1, wherein said at least one measurement trigger event parameter comprises at least one of a hysteresis, an offset, a first threshold, or a second threshold.

4. The method according to claim 1, further comprising:
   receiving a maximum adjustment of said at least one measurement event trigger event parameter for a time period; and
   adjusting said at least one measurement trigger event parameter within a limit of said maximum adjustment.

5. A method comprising, at a base station:
   sending a target parameter representative of a handover rate to a user device;
   receiving at least one measurement report from said user device, wherein said at least one measurement report is based on the target parameter representative of a handover rate; and
   conditionally initiating a handover for said user device based on said at least one measurement report,
   wherein said target parameter representative of a handover rate is a function of one or more of a velocity or a cell beam footprint size at a level of the user device; and
   wherein said velocity is one of a velocity of said base station compared to the ground, a velocity compared to the ground of an apparatus acting as a relay between the user device and said base station, or a relative velocity compared to the user device of an apparatus acting as a relay between the user device and said base station.

6. The method according to claim 5, wherein said target parameter representative of a handover rate is a function of one or of a velocity or a cell beam footprint size at a level of the user device;
   wherein said velocity comprises one of a velocity of said base station compared to the ground, a relative velocity of said base station compared to the user device, a velocity compared to the ground of an apparatus acting as relay between the user device and said base station, or a relative velocity compared to the user device of an apparatus acting as a relay between the user device and said base station.

7. The method according to claim 5, further comprising at least one of:
   sending to the user device a maximum adjustment of said at least one measurement event trigger event parameter for a time period; or
   sending to the user device at least one of a minimum or maximum value for said at least one measurement trigger event parameter.

8. A user device, comprising:
   at least one processor; and
   at least one memory containing computer program code, the at least one memory and computer program code configured, with the at least one processor, to cause the user device at least to perform:
      obtaining a target parameter representative of a handover rate from a base station;
      comparing said target parameter representative of a handover rate with a measured parameter representative of a handover rate;
      adjusting at least one measurement trigger event parameter as a result of said comparison to reduce the difference between said two rates;
      sending a measurement report to said base station if a trigger condition using said at least one adjusted trigger event parameter is met;
      receiving at least one among a minimum or maximum value for said at least one measurement trigger event parameter; and
      adjusting said at least one measurement trigger event parameter within limits of said at least one minimum or maximum value.

9. The user device according to claim 8, wherein said parameter indicative of a handover rate comprises one of a measurement event trigger rate or a handover rate.

10. The user device according to claim 8, wherein said at least one measurement trigger event parameter comprises at least one of a hysteresis, an offset, a first threshold, or a second threshold.

11. The user device according to claim 8, wherein said at least one memory and computer program code are further configured, with the at least one processor, to cause the user device to perform:
    receiving a maximum adjustment of said at least one measurement event trigger event parameter for a time period; and
    adjusting said at least one measurement trigger event parameter within a limit of said maximum adjustment.

12. A base station, comprising:
    at least one processor; and
    at least one memory containing computer program code, the at least one memory and computer program code configured, with the at least one processor, to cause the base station at least to perform:
       sending a target parameter representative of a handover rate to a user device;
       receiving at least one measurement report from said user device, wherein said at least one measurement report is based on the target parameter representative of a handover rate; and conditionally initiating a handover for said user device based on said at least one measurement report, wherein said target parameter representative of a handover rate is a function of one or more of a velocity or a cell beam footprint size at a level of the user device; and wherein said velocity is one of a velocity of said base station compared to the ground, a velocity compared to the ground of an apparatus acting as a relay between the user device and said base station, or a relative velocity compared to the user device of an apparatus acting as a relay between the user device and said base station.

13. The base station according to claim 12, wherein said target parameter representative of a handover rate comprises one of a target measurement event trigger rate or a target handover rate.

14. The base station according to claim 12, wherein said at least one memory and computer program code are further configured, with the at least one processor, to cause the base station to perform one of:

sending to the user device a maximum adjustment of said at least one measurement event trigger event parameter for a time period; or sending to the user device at least one among a minimum or maximum value for said at least one measurement trigger event parameter.

15. The base station according to claim 12, wherein said at least one memory and computer program code are further configured, with the at least one processor, to cause the base station to perform:

sending to the user device an updated target parameter representative of a handover rate as a function of received measurement reports.

16. The base station according to claim 12, wherein said at least one memory and computer program code are further configured, with the at least one processor, to cause the base station to conditionally send an adjusted at least one measurement trigger event parameter update upon a positive check that said adjusted at least one measurement event trigger parameter tends to lead to an increase of said measured parameter representative to a handover rate.

* * * * *